United States Patent [19]

Schaeffer

[11] Patent Number: 4,526,546
[45] Date of Patent: Jul. 2, 1985

[54] FULLY ROTATIONAL ILLUMINATED GLOBE

[75] Inventor: Merle J. Schaeffer, Silver Spring, Md.

[73] Assignee: National Geographic Society, Washington, D.C.

[21] Appl. No.: 629,800

[22] Filed: Jul. 11, 1984

[51] Int. Cl.³ .............................................. G09B 27/08
[52] U.S. Cl. ..................... 434/145; 362/363; 362/809
[58] Field of Search ............... 434/145, 142, 133, 141, 434/131; 362/363, 809

[56] References Cited

U.S. PATENT DOCUMENTS

| | | | |
|---|---|---|---|
| 201,722 | 3/1878 | Topham | 434/133 |
| 1,335,923 | 4/1920 | Schrenkeisen | 434/145 |
| 2,027,156 | 1/1936 | Dupler | 434/145 X |
| 2,099,518 | 11/1937 | Hazlett | 434/142 X |
| 2,115,372 | 4/1938 | Peterson | 362/809 X |
| 2,127,249 | 8/1938 | Dupler | 362/809 X |
| 2,177,352 | 10/1939 | Dupler | 434/145 X |
| 2,200,821 | 5/1940 | Colberg | 434/145 |
| 2,339,385 | 1/1944 | Dupler | 362/363 |
| 2,343,173 | 2/1944 | Dupler | 434/145 |
| 2,345,800 | 4/1944 | Dupler | 434/145 X |
| 2,515,400 | 7/1950 | Dupler | 434/145 |
| 2,809,448 | 10/1957 | Oestergaard et al. | 434/145 |
| 2,932,907 | 4/1960 | Stieber et al. | 434/145 |
| 3,997,980 | 12/1976 | Rogers | 434/141 |

FOREIGN PATENT DOCUMENTS 619998 3/1949 United Kingdom ............... 434/131

*Primary Examiner*—William H. Grieb
*Attorney, Agent, or Firm*—James F. Davis; Joseph P. Lavelle

[57] ABSTRACT

Claimed is an illuminated globe which is fully rotational about its axis. A translucent globe is slidably and rotatably mounted on an axial support pin and rests on a bearing surface. The axial support pin and the globe base are a unitary assembly. A lamp socket is affixed to the top of the support pin and the wiring is passed through the center of the support pin and exits through the side of the base.

3 Claims, 3 Drawing Figures

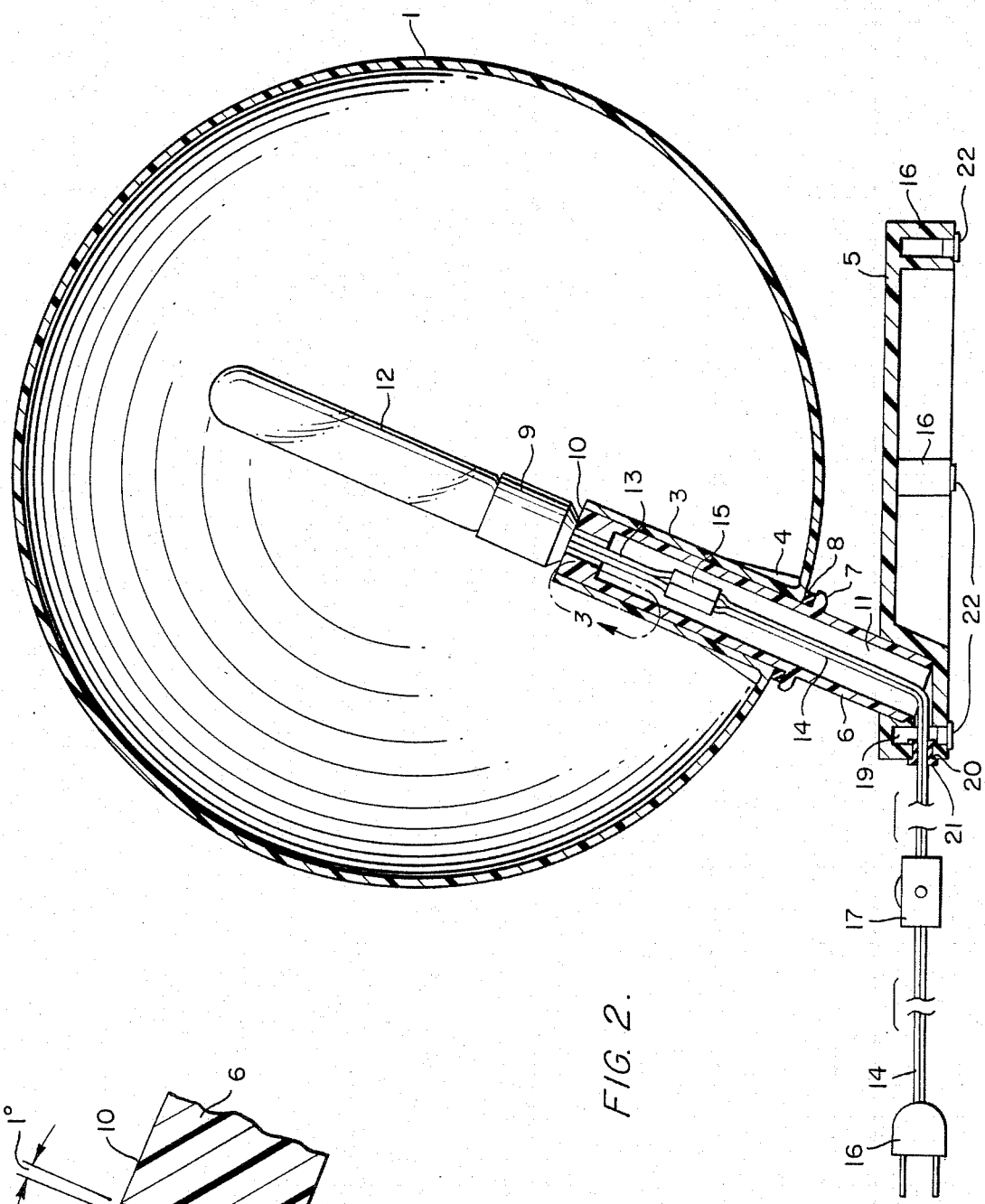
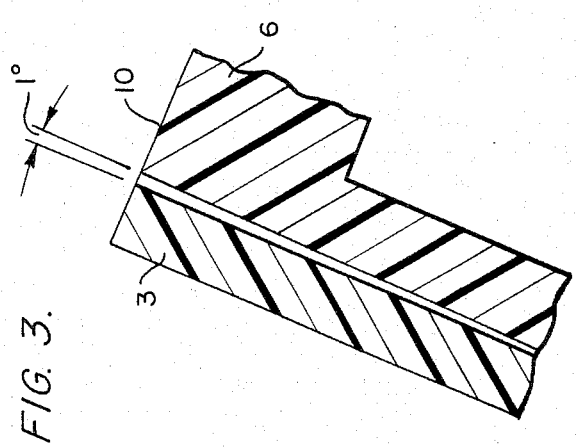

FULLY ROTATIONAL ILLUMINATED GLOBE

BACKGROUND OF THE INVENTION

This invention relates to globes and, in particular, to a novel type of fully-rotational illuminated globe.

Illuminated globes are desirable to consumers because they are attractive, easier to read and provide better definition of features on the surface of the globe than traditional non-illuminated globes. At the same time, it is highly desirable for an illuminated globe to be fully and freely rotational through 360° about its polar axis so that the entire surface of the globe may be examined without moving the base of the globe. Most illuminated globes that are available today are not fully and freely rotational about their axis because the electrical wiring for the lamp fixture in these globes passes from the surface portion of the globe directly to an electrical outlet. Thus, as the globe is rotated, the wiring becomes entangled about the axis support for the globe, making it unsafe, and in some cases impossible, to rotate the globe about its axis.

Numerous attempts have been made to provide an illuminated globe which is fully and freely rotational about its axis support member. For example, the following patents are all addressed to various facets of the problem of creating such an illuminated, rotational globe: U.S. Pat. Nos. 2,932,907 (Stieber, et al); 2,515,400 (Dupler); 2,345,800 (Dupler); 2,339,385 (Dupler); 2,200,821 (Colberg); 2,177,352 (Dupler); 2,127,249 (Dupler); 2,115,372 (Peterson); 2,099,518 (Hazlett); 2,027,156 (Dupler); 1,335,923 (Schrenkeisen).

However, the prior attempts to create an illuminated globe are either inoperable in practice, prohibitively expensive, or will not meet the rigid safety requirements of independent testing agencies, such as Underwriters Laboratories, Inc. Hence, these earlier attempts to create a rotational illuminated globe have not been successful, and in particular, have not been commercially successful.

SUMMARY OF THE INVENTION

It is, therefore, an object of this invention to provide a simple, inexpensive illuminated globe which is fully and freely rotational about its axial support.

It is a further object of this invention to provide a fully rotational illuminated globe that will comply with the safety standards promulgated by nationally recognized testing organizations.

It is a still further object of this invention to provide a unitary base and axial support member for the illuminated globe.

These and additional objects of the invention will become apparent as the invention is described in detail hereinafter.

DETAILED DESCRIPTION OF THE INVENTION

The disclosed invention is an illuminated globe which is fully and freely rotational about its axial support member. Fully rotational illuminated globes are commercially desirable for many reasons, as indicated above. Yet, in order to be a commercially viable product, a fully rotational illuminated globe must be safe, durable, and yet constructed in a manner which does not result in prohibitive expense. Particularly important is the manner in which the globe is mounted to its base, because unless an appropriate base and mounting assembly is utilized, the desirable safety, durability, and cost constraints which the globe must meet cannot be met.

The invention, which solves the above problems in the prior art, will now be described in greater detail with reference to the accompanying drawings, wherein:

FIG. 2 is a cut-away side view of the rotational illuminated globe assembled for operation; and FIG. 3 is a fractional section taken along line 3 in FIG. 2.

Figure 1:
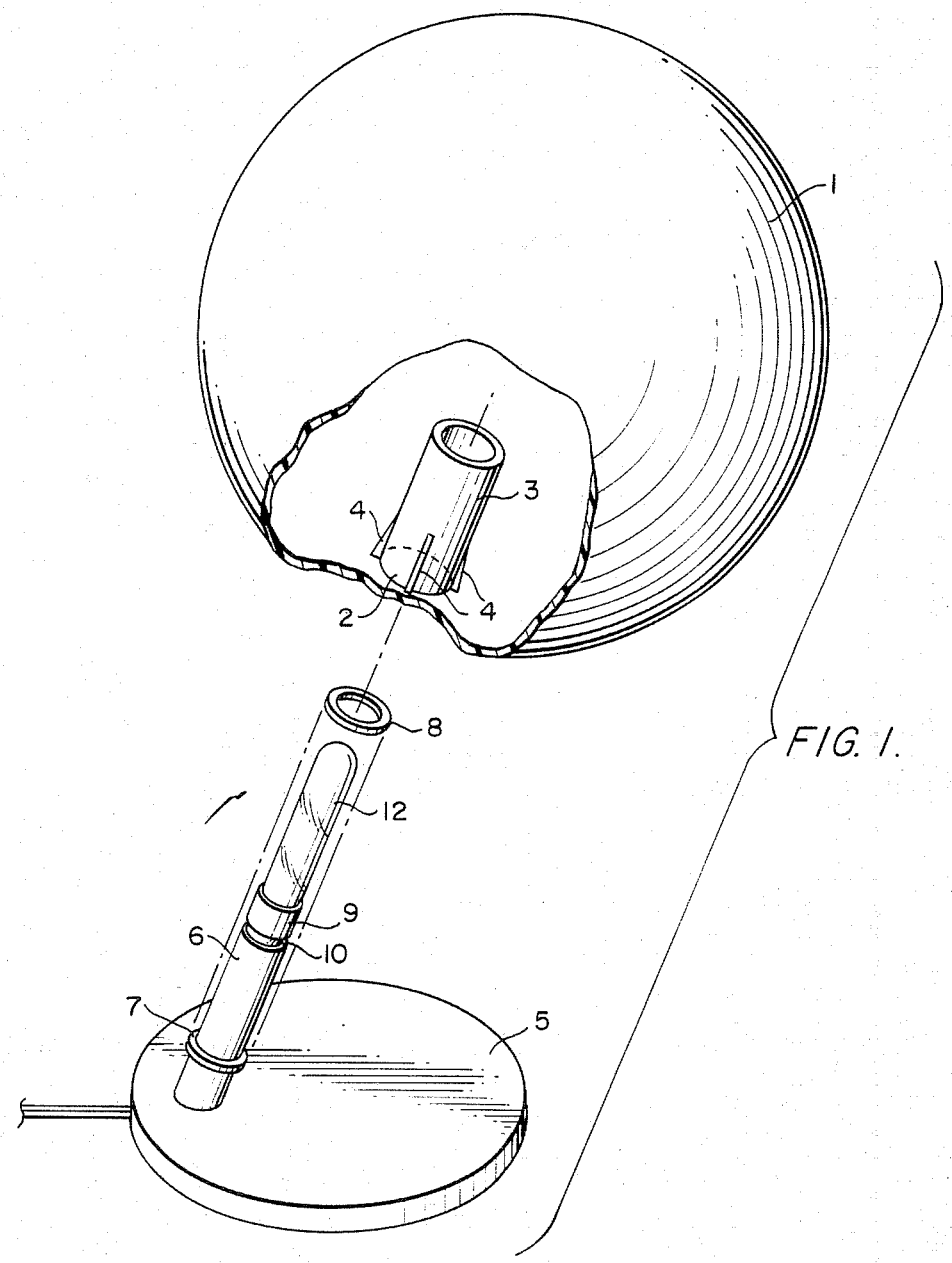
FIG. 1 is an exploded view showing the base, support, lamp, washer and globe.

FIG. 1 shows the invention generally in an exploded view. A translucent globe 1 which may be made of a suitable plastic material, such as a clear acrylic or high impact styrene, defines an aperture 2 at its South Pole. A cylindrical sleeve 3 made of a suitably durable material, such as styrene, is affixed to the interior of the globe at aperture 2. While several methods may be utilized to affix the sleeve to the globe, the currently preferred method is to mold the sleeve onto the globe. The interior diameter of the sleeve is equal to the diameter of aperture 2. A series of webs 4 reinforce the sleeve/globe connection.

The base 5 and axial support member 6 are of a unitary construction, formed by inserting the support member 6 into the base 5 while the base 5 is hot from molding and permitting the base 5 to contract or shrink onto the support member 6. A bearing surface 7 is located on the axial support member 6, preferably by molding it as part of the support member. A washer 8 made of suitable friction-reducing material, such as nylon, rests on the bearing surface 7.

A lamp socket 9, having a diameter less than the axial support member 6 is affixed to the top 10 of the support member 6. The bulb 12 then screws into the lamp socket 9. Both the socket and bulb are of standard construction and will operate on the 120 volt current supplied to most homes, schools, and offices. The lamp socket's wiring 13 is attached to the power cord 14 by a standard crimp connection 15. A two-pronged plug 16 is attached to the end of the power cord 14 to allow connection to an electrical outlet (not shown). An in-line on/off switch 17 is also provided at an intermediate point on the power cord 14.

The base 5 further comprises a series of supporting legs 16 and stops 22. As noted above, the axial support pin 6 is molded into base 5. The base 5 has a hollow passageway 19 which is in communication with the hollow center 11 of the axial support 6, thereby allowing the lamp wiring/power cord assembly to pass through the hollow center of the axial support member 11, through the passageway 19 in the base 5 and exit the base through an aperture 20 in the side of the base. A stress relief or tab 21 secures the power cord from movement with respect to the aperture in the base.

The axial support pin 6 is of slightly smaller diameter at its top 10 than at the point were the bearing surface 7 is affixed to it. This creates a slope in the outside surface of the axial support member. Thus, when the globe 1 and sleeve 3 are mounted on the support member, a small, approximately 1° draft exists, as best seen in FIG. 3. This 1° draft allows the sleeve 3 to be more easily inserted and removed from the support member 6, reduces wear, and yet retains a sufficiently snug contact between the sleeve and support member to provide the necessary stability for the globe.

In operation, the globe 1 is placed on the axial support member 6 so that the globe rests on the washer 8 and bearing surface 7. The sleeve 3 provides stability for the globe 1 as shown in FIG. 2. The globe 1 is then free to rotate fully about its axis.

It should be understood that numerous changes in the details of construction may be effected without departing from the spirit of the invention, especially as defined in the following claims.

What I claim as new and desire to secure by Letters Patent of the United States is:

1. A fully-rotational illuminated globe comprises:
   (a) a base;
   (b) a post affixed to said base, said post having:
      (i) a bearing surface located intermediate to the end points of said post, and
      (ii) a hollow center;
   (c) a lamp socket attached to said post; the wiring for said lamp socket passing through the hollow center of said post; and
   (d) a translucent globe defining an aperture at one pole thereof, said globe having a sleeve integral with said globe and located at the aperture thereof, so that said globe removably and rotatably engages said post and rests on said bearing surface, and said post and bearing surface provide the sole means of support for said globe.

2. The apparatus of claim 1 further comprising: a means for reinforcing the globe-sleeve assembly.

3. The apparatus of claim 1 or 2 wherein said post has about a 1° draft from the bearing surface to apex thereof.

* * * * *